US012593269B2

(12) United States Patent
Faccin et al.

(10) Patent No.: US 12,593,269 B2
(45) Date of Patent: Mar. 31, 2026

(54) ENSURING COMPATIBILITY BETWEEN NETWORK SLICE OPERATING FREQUENCIES AND USER EQUIPMENT (UE) RADIO CAPABILITIES

(71) Applicant: QUALCOMM Incorporated, San Diego, CA (US)

(72) Inventors: Stefano Faccin, San Ysidro, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 17/906,814

(22) PCT Filed: May 12, 2021

(86) PCT No.: PCT/US2021/032000
§ 371 (c)(1),
(2) Date: Sep. 20, 2022

(87) PCT Pub. No.: WO2021/236393
PCT Pub. Date: Nov. 25, 2021

(65) Prior Publication Data
US 2023/0141754 A1 May 11, 2023

(30) Foreign Application Priority Data
May 22, 2020 (GR) .............................. 20200100270

(51) Int. Cl.
*H04W 60/00* (2009.01)
*H04W 48/18* (2009.01)
(52) U.S. Cl.
CPC ........... *H04W 48/18* (2013.01); *H04W 60/00* (2013.01)

(58) Field of Classification Search
CPC ..... H04W 48/18; H04W 60/00; H04W 12/08; H04L 65/1016; H04L 65/1073
See application file for complete search history.

(56) References Cited

U.S. PATENT DOCUMENTS

| | | | | |
|---|---|---|---|---|
| 2018/0367980 A1* | 12/2018 | Lee | .......................... | H04L 67/51 |
| 2019/0174449 A1* | 6/2019 | Shan | ...................... | H04W 60/04 |
| 2020/0053554 A1* | 2/2020 | Kim | ...................... | H04W 60/00 |

OTHER PUBLICATIONS

3GPP TS 23.502 V16.4.0 (Mar. 2020) 3rd Geenration Partnership Project; Technical Specification Group Services and System Aspects; Procedures for the 5G System (5GS); Stage 2.*

(Continued)

*Primary Examiner* — Marcus Hammonds
(74) *Attorney, Agent, or Firm* — Patterson & Sheridan, L.L.P.

(57) ABSTRACT

Certain aspects of the present disclosure provide techniques for ensuring compatibility between network slice operating frequencies and user equipment (UE) radio capabilities. An example method generally includes receiving, from a network core entity, a request for information about capabilities of a user equipment (UE) and information about a plurality of network slices in an allowed set of network slices for the UE; identifying, based on UE capability information, a subset of the allowed set of network slices that the UE can use for communications between the UE and the network entity; generating a response including at least the subset of the allowed set of network slices that the UE can use for communications between the UE and the network entity; and transmitting the response to the network core entity.

30 Claims, 12 Drawing Sheets

(56)　　　　　References Cited

OTHER PUBLICATIONS

CMCC: "Email discussion for R17 Proposals on Slicing", 3GPP Draft, RP-191778, 3GPP TSG RAN Meeting #85, Summary for RAN Slicing Email Discussion V2, 3rd Generation Partnership Project (3GPP), Mobile Competence Centre, 650, Route Des Lucioles, F-06921 Sophia-Antipolis Cedex, Fran, vol. TSG RAN. No. Newport Beach, USA, Sep. 16, 2019-Sep. 20, 2019, Sep. 9, 2019 (Sep. 9, 2019), XP051782340, 43 Pages, Section: "Issue 1: Fast Access to the Intended Slice", p. 3-p. 8.

Huawei, et al., "Update Slice-Specific Authentication and Authorisation", 3GPP TSG-SA WG2 Meeting #133, S2-1905664_TS_23. 502_Update Slice-Specific Authentication and Authorisation R3, 3rd Generation Partnership Project, Mobile Competence Centre, 650, Route Des Lucioles, F-06921 Soph, vol. SA WG2. No. Reno, US, May 13, 2019-May 17, 2019, May 7, 2019, XP051735858, 21 Pages, Figures 4.2.2.2.2-1, 4.2.2.3.3-1, Section 4.2.2.2.2, p. 4-p. 6, Sections: 4.2.2.3.3 and 4.2.x.2, p. 16-p. 19.

International Search Report and Written Opinion—PCT/US2021/032000—ISA/EPO—Sep. 30, 2021.

Qualcomm Incorporated: "KI #7, New Sol: Compatibility of S-NS-SAls Operating Frequency Bands with UE Radio Capabilities", 3GPP Draft, SA WG2 Meeting #139e, S2-2003793, 3rd Generation Partnership Project (3GPP), Mobile Competence Centre, 650, Route Des Lucioles, F-06921 Sophia-Antipolis Cedex, France, vol. SA WG2, No. e-Meeting; Jun. 1, 2020-Jun. 8, 2020 May 22, 2020 (May 22, 2020), XP051889817, pp. 1-8, the whole document.

Samsung: "Single Value of NSSAI in RRC for CCNF(AMF) Selection", 3GPP Draft, SA WG2 Meeting #119, S2-171153 (revision of S2-17XXXX), Single Value of NSSAI in RRC for CCNF (AMF) Selection, 3rd Generation Partnership Project (3GPP), Mobile Competence Centre, 650, Route Des Lucioles, F-06921 Sophia-Antipolis Cedex, vol. SA WG2, No. Dubrovnik, Croatia, Feb. 13, 2017-Feb. 17, 2017, Feb. 7, 2017 (Feb. 7, 2017), XP051228409, 3 Pages, Sections: 1 and 5.13.X, p. 2-p. 3.

Vivo Mobile Communication Co. Ltd, et al., "Enable a UE to Indicate 5G SRVCC Support When Registering with EPS and 3G/4G SRVCC Support When Registering with 5GS", 3GPP Draft, S2-2000111, 3GPP TSG-SA2 Meeting #136-AH, 3rd Generation Partnership Project (3GPP), Mobile Competence Centre, 650, Route Des Lucioles, F-06921 Sophia-Antipolis Cedex, France, vol. SA WG2, No. Incheon, Korea (Republic of), Jan. 13, 2020-Jan. 17, 2020, Jan. 7, 2020 (Jan. 7, 2020), XP051842220, 21 Pages, Retrieved from the Internet: URL:https://ftp.3gpp.org/tsg_sa/WG2_Arch/TSGS2_136AH_Incheon/Docs/S2-2000111.zip, S2-2000111-23502-g30-srvcc.doc [retrieved on Jan. 7, 2020] Figures 4.2.8a-1, 4.2.8, section 21, p. 15 Sections, 25. 4.2.8a, p. 19-p. 21.

Huawei., et al., "Update Slice-Specific Authentication and Authorisation", 3GPP TSG-SA WG2 Meeting #133, S2-1905664 (Revision of S2-1904723), 1317 May 2019, Reno, US, May 7, 2019, 21 Pages.

* cited by examiner

| | 1 | 2 | 3 | 4 | 5 | 6 | 7 | 8 | |
|---|---|---|---|---|---|---|---|---|---|
| | | | NSSAI IEI | | | | | | Octet 1 |
| | | | Length of NSSAI contents | | | | | | Octet 2 |
| | | | | | | | | | Octet 3 |
| | | | S-NSSAI value 1 | | | | | | Octet m |
| | | | | | | | | | Octet m+1* |
| | | | S-NSSAI value 2 | | | | | | Octet n* |
| | | | | | | | | | Octet n+1* |
| | | | ⋯ | | | | | | Octet u* |
| | | | S-NSSAI value n | | | | | | Octet u+1* |
| | | | | | | | | | Octet v* |

NSSAI Information Element

FIG. 4

| | 8 | 7 | 6 | 5 | 4 | 3 | 2 | 1 | |
|---|---|---|---|---|---|---|---|---|---|
| | | | | S-NSSAI IEI | | | | | Octet 1 |
| | | | Length of S-NSSAI contents | | | | | | Octet 2 |
| | | | | SST | | | | | Octet 3 |
| | | | | SD | | | | | Octet 4* |
| | | | | | | | | | Octet 6* |
| | | | Mapped HPLMN SST | | | | | | Octet 7* |
| | | | Mapped HPLMN SD | | | | | | Octet 8* |
| | | | | | | | | | Octet 10* |

S-NSSAI Information Element

FIG. 5

NSSAI inclusion modes and NSSAI which shall be provided to the lower layers

| Initial NAS message | NSSAI inclusion mode A | NSSAI inclusion mode B | NSSAI inclusion mode C | NSSAI inclusion mode D |
|---|---|---|---|---|
| REGISTRATION REQUEST message:<br>    I) including the 5GS registration type IE set to "initial registration" | Requested NSSAI | Requested NSSAI | Requested NSSAI | No NSSAI |
| REGISTRATION REQUEST message:<br>    I) including the 5GS registration type IE set to "mobility registration updating"; and<br>    ii) initiated by case other than case g) or n) in subclause 5.5.1.3.2 | Requested NSSAI | Requested NSSAI | Requested NSSAI | No NSSAI |
| REGISTRATION REQUEST message:<br>    I) including the 5GS registration type IE set to "mobility registration updating"; and<br>    ii) initiated by case g) or n) in subclause 5.5.1.3.2 | Allowed NSSAI | Allowed NSSAI | No NSSAI | No NSSAI |
| REGISTRATION REQUEST message:<br>    I) including the 5GS registration type IE set to "periodic registration updating" | Allowed NSSAI | Allowed NSSAI | No NSSAI | No NSSAI |
| SERVICE REQUEST message | Allowed NSSAI | See NOTE 1 | No NSSAI | No NSSAI |
| NOTE 1: All the S-NSSAIs of the PDU sessions that have the user-plane resources requested to be re-established by the service request procedure or the S-NSSAIs of a control plane interaction triggering the service request is related to (see 3GPP TS 23.501 [8]) | | | | |
| NOTE 2: For a REGISTRATION REQUEST message including the 5GS registration type IE set to "emergency registration", a DEREGISTRATION REQUEST message and a SERVICE REQUEST message including the service type IE set to "emergency services" or "emergency services fallback", no NSSAI is provided to the lower layers. | | | | |
| NOTE 3: The mapped configured S-NSSAI(s) from the S-NSSAI(s) of the HPLMN are not included as part of the S-NSSAIs in the requested NSSAI or the allowed NSSAI when it is provided to the lower layers. | | | | |

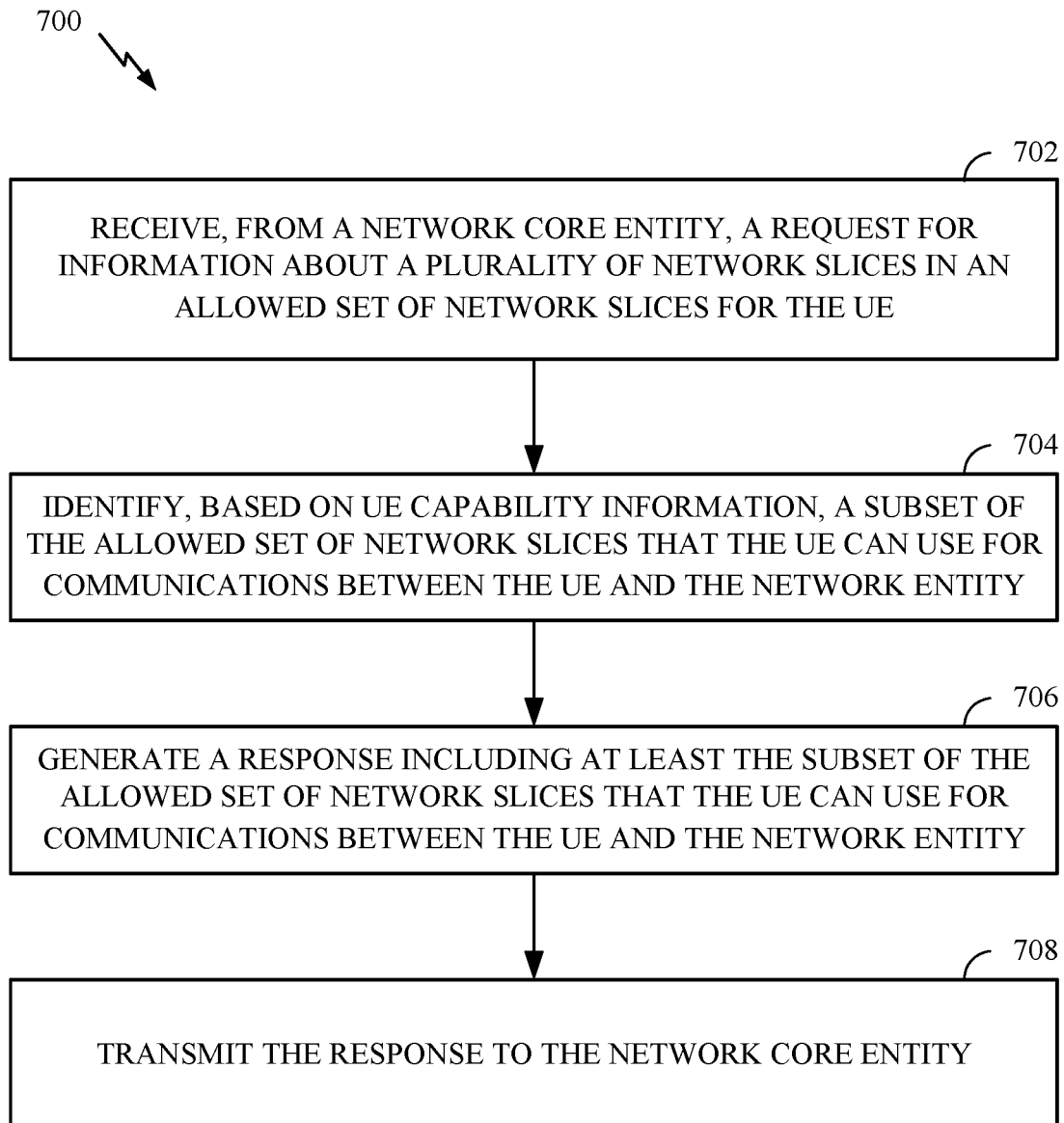

702

RECEIVE, FROM A NETWORK CORE ENTITY, A REQUEST FOR INFORMATION ABOUT A PLURALITY OF NETWORK SLICES IN AN ALLOWED SET OF NETWORK SLICES FOR THE UE

704

IDENTIFY, BASED ON UE CAPABILITY INFORMATION, A SUBSET OF THE ALLOWED SET OF NETWORK SLICES THAT THE UE CAN USE FOR COMMUNICATIONS BETWEEN THE UE AND THE NETWORK ENTITY

706

GENERATE A RESPONSE INCLUDING AT LEAST THE SUBSET OF THE ALLOWED SET OF NETWORK SLICES THAT THE UE CAN USE FOR COMMUNICATIONS BETWEEN THE UE AND THE NETWORK ENTITY

708

TRANSMIT THE RESPONSE TO THE NETWORK CORE ENTITY

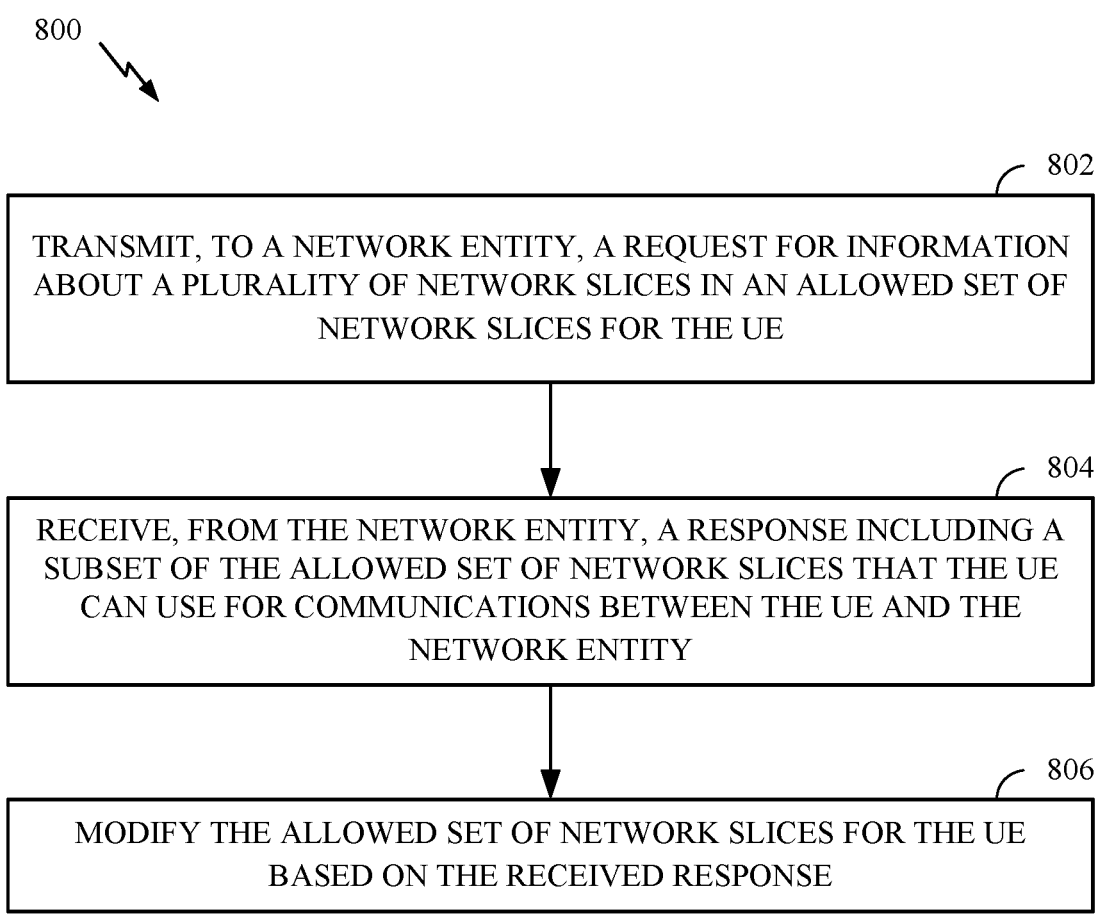

802

TRANSMIT, TO A NETWORK ENTITY, A REQUEST FOR INFORMATION ABOUT A PLURALITY OF NETWORK SLICES IN AN ALLOWED SET OF NETWORK SLICES FOR THE UE

804

RECEIVE, FROM THE NETWORK ENTITY, A RESPONSE INCLUDING A SUBSET OF THE ALLOWED SET OF NETWORK SLICES THAT THE UE CAN USE FOR COMMUNICATIONS BETWEEN THE UE AND THE NETWORK ENTITY

806

MODIFY THE ALLOWED SET OF NETWORK SLICES FOR THE UE BASED ON THE RECEIVED RESPONSE

| IE/Group Name | Presence | Range | IE Type and Reference | Semantics Description | Criticality | Assigned Criticality |
|---|---|---|---|---|---|---|
| Message Type | M | | 9.3.1.1 | | YES | Reject |
| AMF UE NGAP ID | M | | 9.3.3.1 | | YES | Reject |
| RAN UE NGAP ID | M | | 9.3.3.2 | | YES | Reject |
| UE Radio Capability | O | | 9.3.1.74 | | YES | Ignore |
| UE NSSAI | O | | | | YES | |

| IE/Group Name | Presence | Range | IE Type and Reference | Semantics Description | Criticality | Assigned Criticality |
|---|---|---|---|---|---|---|
| Message Type | M | | 9.3.1.1 | | YES | Reject |
| AMF UE NGAP ID | M | | 9.3.3.1 | | YES | Ignore |
| RAN UE NGAP ID | M | | 9.3.3.2 | | YES | Ignore |
| IMS Voice Support Indicator | M | | 9.3.1.89 | | YES | Reject |
| Supported NSSAI | O | | | | | |
| Criticality Diagnostics | O | | 9.3.1.3 | | YES | Ignore |

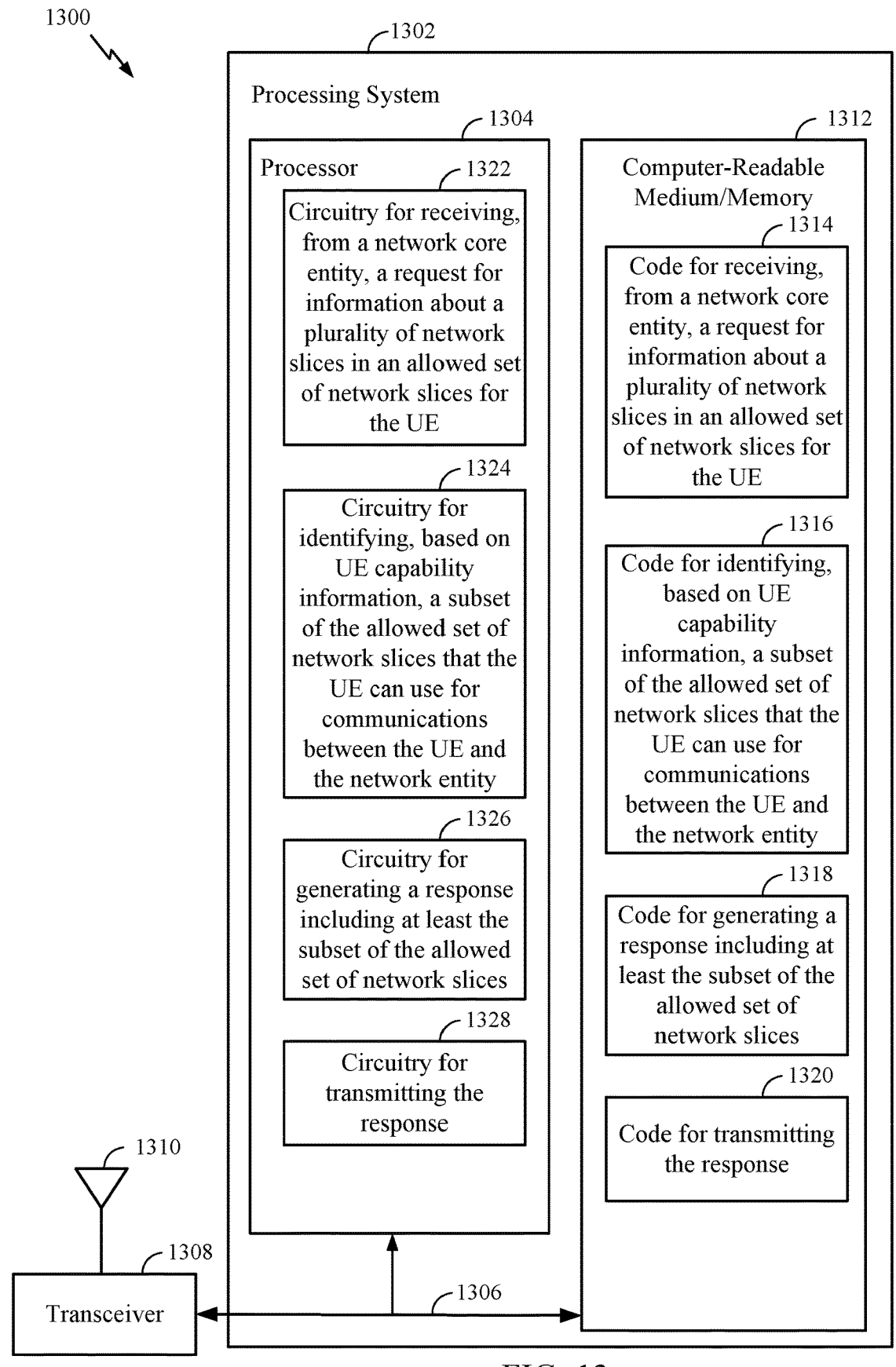

Processing System

1304

Processor                          1322

Circuitry for receiving, from a network core entity, a request for information about a plurality of network slices in an allowed set of network slices for the UE

1324

Circuitry for identifying, based on UE capability information, a subset of the allowed set of network slices that the UE can use for communications between the UE and the network entity

1326

Circuitry for generating a response including at least the subset of the allowed set of network slices

1328

Circuitry for transmitting the response

1312

Computer-Readable Medium/Memory

1314

Code for receiving, from a network core entity, a request for information about a plurality of network slices in an allowed set of network slices for the UE

1316

Code for identifying, based on UE capability information, a subset of the allowed set of network slices that the UE can use for communications between the UE and the network entity

1318

Code for generating a response including at least the subset of the allowed set of network slices

1320

Code for transmitting the response

1310

1308

1306

Transceiver

FIG. 13

ENSURING COMPATIBILITY BETWEEN NETWORK SLICE OPERATING FREQUENCIES AND USER EQUIPMENT (UE) RADIO CAPABILITIES

CROSS-REFERENCE TO RELATED APPLICATIONS

This application is a national stage application under 35 U.S.C. 371 of PCT/US2021/032000, filed May 12, 2021, which claims benefit to Greek Provisional Patent Application No. 20200100270, entitled "Ensuring Compatibility Between Network Slice Operating Frequencies and User Equipment (UE) Radio Capabilities," filed May 22, 2020, and assigned to the assignee hereof, the contents of which are hereby incorporated by reference in their entirety.

BACKGROUND

Field of the Disclosure

Aspects of the present disclosure relate to wireless communications, and more particularly, to techniques for ensuring compatibility between network slice operating frequencies and user equipment (UE) radio capabilities.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include compatibility between network slice operating frequencies and UE radio capabilities.

One innovative aspect of the subject matter described in this disclosure can be implemented in a method for wireless communication by a network entity. The method generally includes receiving, from a network core entity, a request for information about capabilities of a user equipment (UE) and information about a plurality of network slices in an allowed set of network slices for the UE; identifying, based on UE capability information, a subset of the allowed set of network slices that the UE can use for communications between the UE and the network entity; generating a response including at least the subset of the allowed set of network slices that the UE can use for communications between the UE and the network entity; and transmitting the response to the network core entity.

One innovative aspect of the subject matter described in this disclosure can be implemented in a method for wireless communication by a network core entity. The method generally includes transmitting, to a network entity, a request for information about capabilities of a user equipment (UE) and information about a plurality of network slices in an allowed set of network slices for the UE; receiving, from the network entity, a response including a subset of the allowed set of network slices that the UE can use for communications between the UE and the network entity; and modifying the allowed set of network slices for the UE based on the received response.

One innovative aspect of the subject matter described in this disclosure can be implemented in a method for wireless communication by a network entity. The method generally includes receiving, from a network core entity, a request for information about a plurality of network slices in an allowed set of network slices for a user equipment (UE) connected with the network entity; identifying, based on UE capability information for the UE, a subset of the allowed set of network slices that the UE can use for communications between the UE and the network entity; and communicating with the UE using the identified subset of the allowed set of network slices.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 is an example format of a network slice selection assistance information (NSSAI) information element (IE).

FIG. 5 is an example format of a single NSSAI (S-NSSAI) IE.

FIG. 6 is a table showing example NSSAI inclusion modes.

FIG. 7 illustrates example operations that may be performed by a network entity to ensure compatibility between network slice operating frequencies and user equipment (UE) radio capabilities, in accordance with certain aspects of the present disclosure.

FIG. 8 illustrates example operations that may be performed by a network core entity to ensure compatibility between network slice operating frequencies and user equipment (UE) radio capabilities, in accordance with certain aspects of the present disclosure.

FIG. 11 illustrates an example radio capability check request message used to request information about radio capabilities of a UE, in accordance with certain aspects of the present disclosure.

FIG. 12 illustrates an example radio capability check response message used to indicate whether a UE supports communications using a network slice, in accordance with certain aspects of the present disclosure.

FIG. 13 illustrates a communications device that may include various components configured to perform operations for the techniques disclosed herein in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
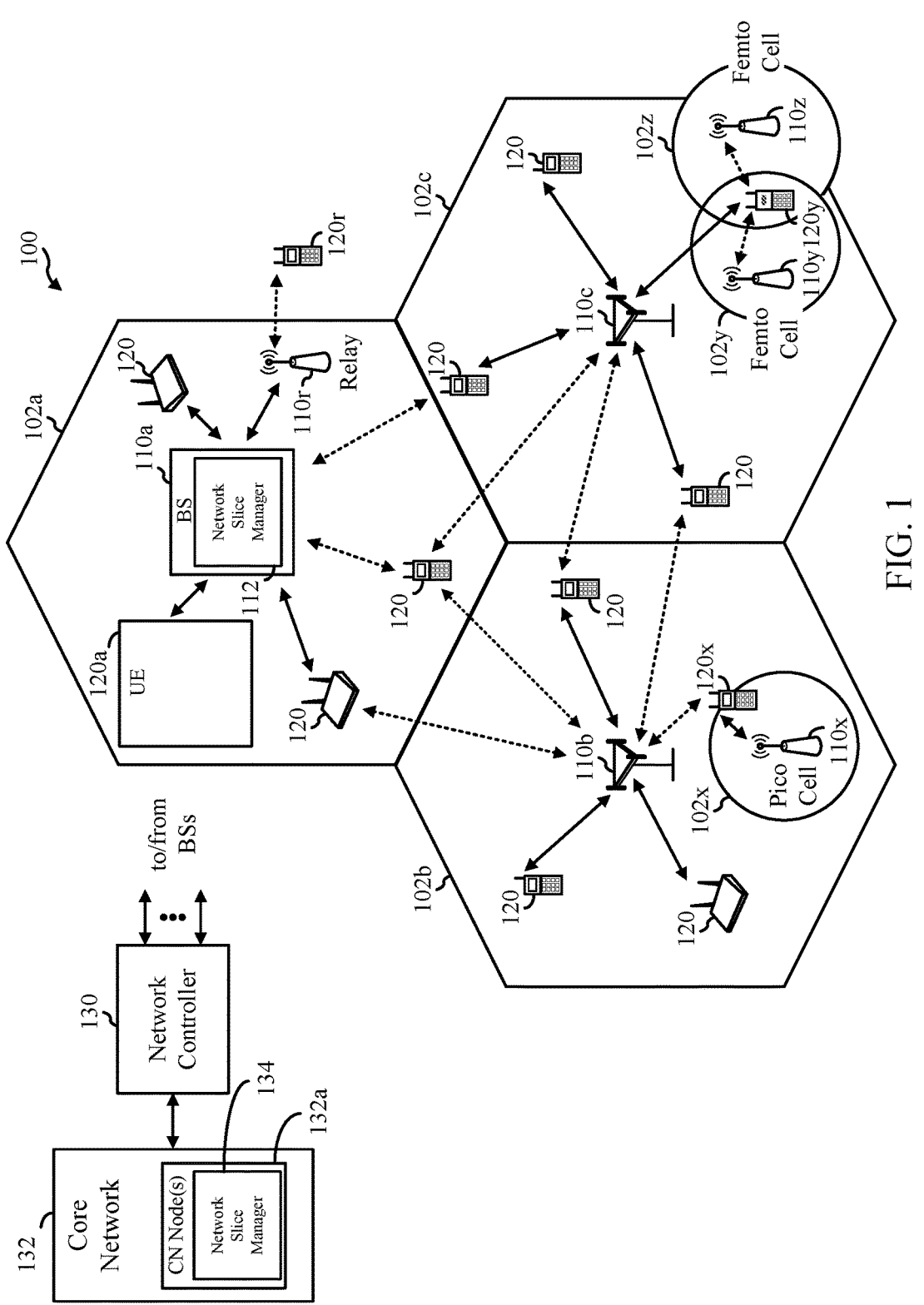
FIG. 1 is a block diagram conceptually illustrating an example telecommunications system, in accordance with certain aspects of the present disclosure.

Aspects of the present disclosure provide apparatus, methods, processing systems, and computer readable mediums for ensuring compatibility between network slice operating frequencies and user equipment (UE) radio capabilities, in accordance with certain aspects of the present disclosure.

The following description provides examples of ensuring compatibility between network slice operating frequencies and user equipment (UE) radio capabilities, in accordance with certain aspects of the present disclosure, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems, including later technologies.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

5G NR may utilize OFDM with a cyclic prefix (CP) on the uplink and downlink and include support for half-duplex operation using time division duplexing (TDD). A subframe can be 1 ms, but the basic transmission time interval (TTI) may be referred to as a slot. A subframe contains a variable number of slots (e.g., 1, 2, 4, 8, 16, . . . slots) depending on the subcarrier spacing (SCS). The NR resource block (RB) may be 12 consecutive frequency subcarriers. NR may support a base SCS of 15 KHz and other subcarrier spacing may be defined with respect to the base SCS, for example, 30 kHz, 60 kHz, 120 kHz, 240 kHz, etc. The symbol and slot lengths scale with the SCS. The CP length also depends on the SCS. 5G NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more BSs 110 and/or UEs 120 via one or more interfaces as discussed more detail below with respect to FIG. 3.

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

The wireless communication network 100 may be in communication with the CN 132, which includes one or more CN nodes 132*a*. A network controller 130 may couple to a set of BSs 110 and provide coordination and control for these BSs 110. The network controller 130 may communicate with the BSs 110 via a backhaul. The network controller 130 may also couple to one or more of the CN nodes 132*a*.

According to certain aspects, the BSs 110 and core network 132 may be configured to manage network slices assigned to a UE such that compatibility is ensured between network slice operating frequencies and the radio capabilities of the UEs 120 in wireless communication network 100. As shown in FIG. 1, the BS 110*a* includes a network slice manager 112. The network slice manager 112 may be configured to exchange information with a network core entity (e.g., a core network node 132) to ensure compatibility between network slice operating frequencies and the radio capabilities of a UE served by the BS 110*a*, in accordance with aspects of the present disclosure. As shown in FIG. 1, the core network nodes 132*a* include a network slice manager 134. The network slice manager 132 may be configured to exchange information with a network entity (e.g., a BS 110) to ensure compatibility between network slice operating frequencies and the radio capabilities of a UE served by the BS 110*a*, in accordance with aspects of the present disclosure.

Figure 2:
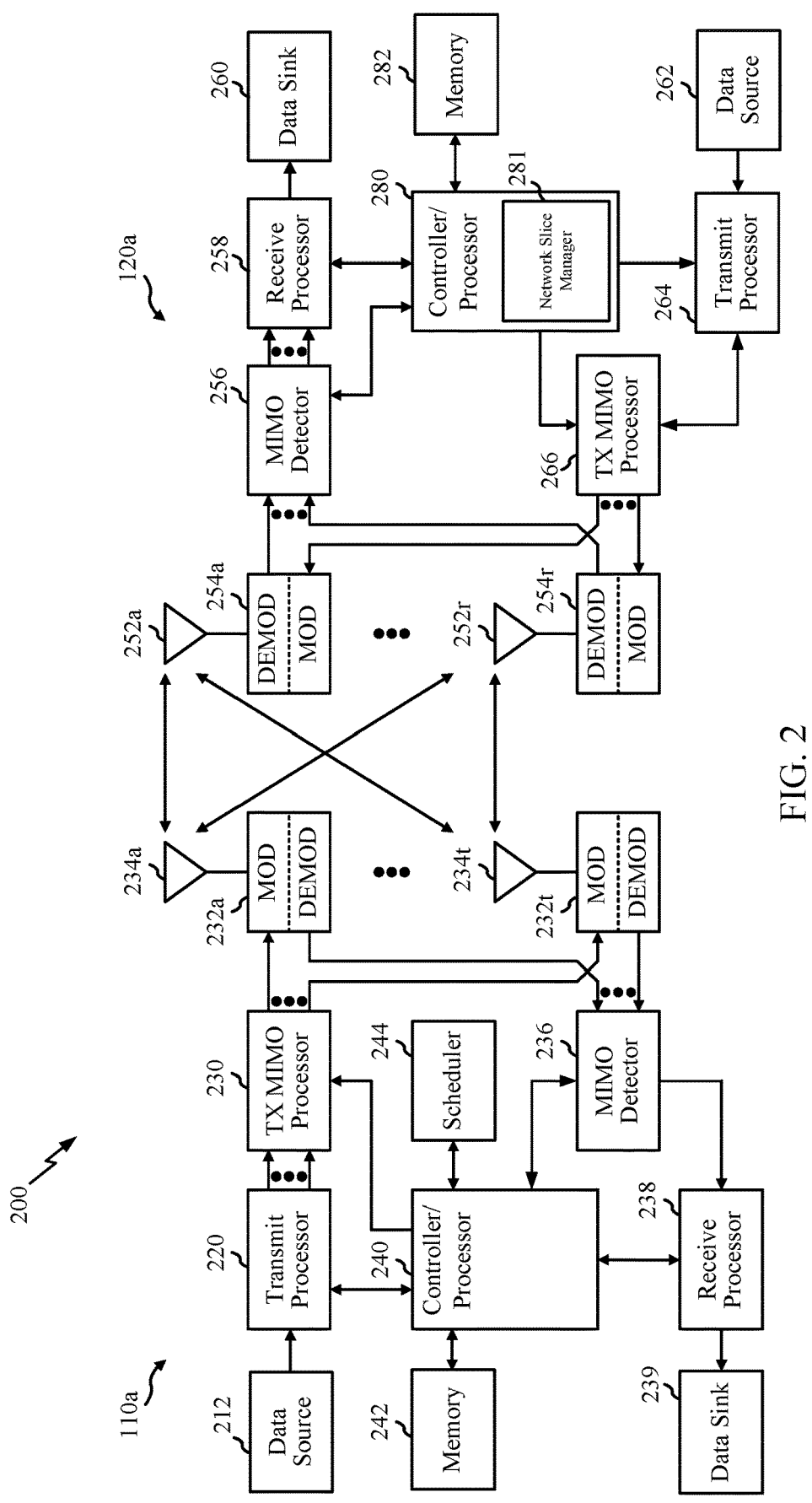
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a network slice manager 241 that may be configured to ensure compatibility between network slice operating frequencies and UE radio capabilities, according to aspects described herein. Although shown at the controller/processor, other components of the UE 120a and BS 110a may be used to perform the operations described herein.

Figure 3:
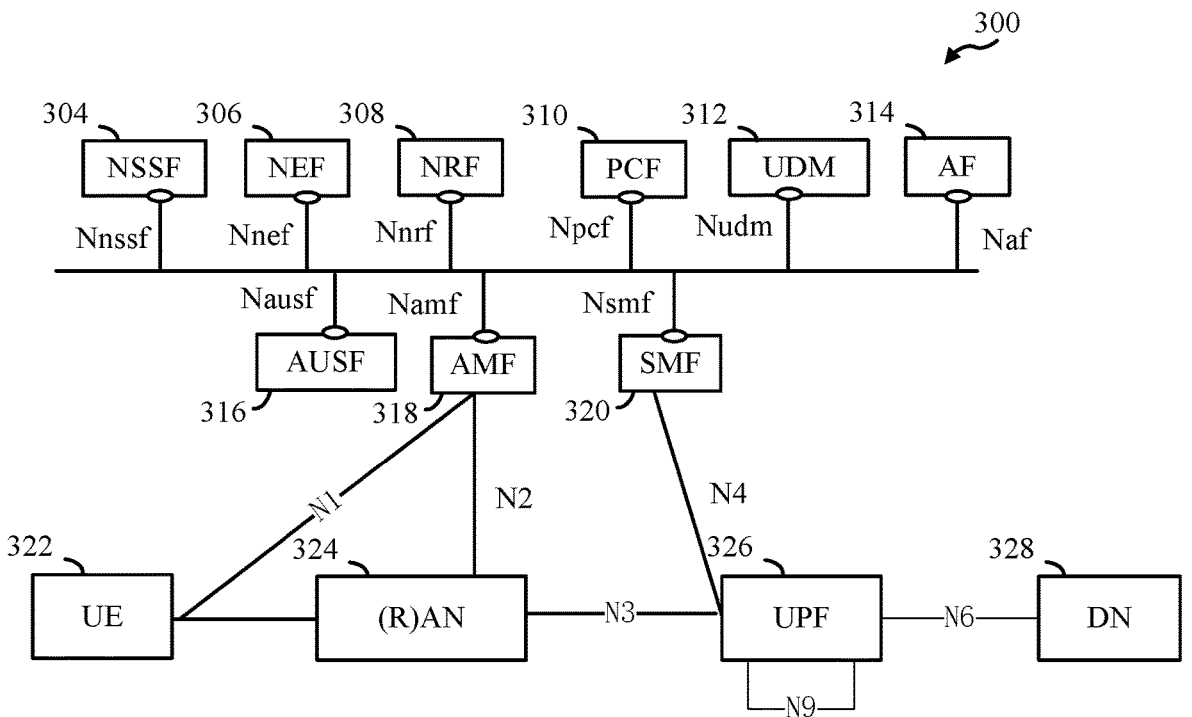
FIG. 3 is a block diagram illustrating an example architecture of a core network (CN) and radio access network (RAN), in accordance with certain aspects of the present disclosure.

FIG. 3 is a block diagram illustrating an example architecture of a core network (CN) 300 (e.g., such as the CN 132 in FIG. 1) in communication with a RAN 324, in accordance with certain aspects of the present disclosure. As shown in FIG. 3, the example architecture includes the CN 300, RAN 324, UE 322, and data network (DN) 328 (e.g. operator services, Internet access or third party services).

The CN 300 may host core network functions. CN 300 may be centrally deployed. CN 300 functionality may be offloaded (e.g., to advanced wireless services (AWS)), in an effort to handle peak capacity. As shown in FIG. 3, the example CN 300 may be implemented by one or more network entities that perform network functions (NF) including Network Slice Selection Function (NSSF) 304, Network Exposure Function (NEF) 306, NF Repository Function (NRF) 308, Policy Control Function (PCF) 310, Unified Data Management (UDM) 312, Application Function (AF) 314, Authentication Server Function (AUSF) 316, Access and Mobility Management Function (AMF) 318, Session Management Function (SMF) 320; User Plane Function (UPF) 326, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 318 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 322 and SMF 320; transparent proxy for routing SM messages; access authentication; access authorization; transport for short message service (SMS) messages between UE 322 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 322 and a location management function (LMF) as well as between RAN 324 and LMF; evolved packet service (EPS) bearer ID allocation for interworking with EPS; and/or UE mobility event notification; and/or other functionality.

SMF 320 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 326 may support: packet routing and forwarding, packet inspection, quality-of-service (QoS) handling, external protocol data unit (PDU) session point of interconnect to DN 328, and anchor point for intra-RAT and inter-RAT mobility. PCF 310 may support: unified policy framework, providing policy rules to control protocol functions, and/or access subscription information for policy decisions in UDR. AUSF 316 may acts as an authentication server. UDM 312 may support: generation of Authentication and Key Agreement (AKA) credentials, user identification handling, access authorization, and subscription management. NRF 308 may support: service discovery function, and maintain NF profile and available NF instances. NSSF may support: selecting of the Network Slice instances to serve the UE 322, determining the allowed network slice selection assistance information (NSSAI), and/or determining the AMF set to be used to serve the UE 322.

NEF 306 may support: exposure of capabilities and events, secure provision of information from external application to 3 GPP network, translation of internal/external information. AF 314 may support: application influence on traffic routing, accessing NEF 306, and/or interaction with policy framework for policy control.

As shown in FIG. 3, the CN 300 may be in communication with the AS 302, UE 322, RAN 324, and DN 328. In some examples, the CN 300 communicates with the external AS 302 via the NEF 306 and/or AF 314. In some examples, the CN 300 communicates with the RAN 324 (e.g., such as the BS 110a in the wireless communication network 100 illustrated in FIG. 1) and/or the UE 322 (e.g., such as the UE 120a in the wireless communication network 100 illustrated in FIG. 1) via the AMF 318.

The NSSF 304 supports the following functionality: selecting of the network slice instances to serve the UE 322; determining the allowed network slice selection assistance information (NSSAI); and/or determining the AMF set to be used to serve the UE 322.

As mentioned above, aspects of the present disclosure relate to network slice selection assistance information (NS-SAI) signalling. A network slice may be defined as a logical network that provides specific network capabilities and network characteristics. A network slice instance may be defined as a set of network function instances and the required resources (e.g., compute, storage, and networking resources) which form a deployed network slice.

A network slice is identified by single network slice selection assistance information (S-NSSAI). NSSAI is a list of one or more S-NSSAIs. An S-NSSAI includes a slice/ service type (SST), which refers to the expected network slice behavior (e.g., features and services), and a slice differentiator (SD), which is optional information that complements the SST(s) to differentiate amongst multiple network slices of the same SST. An S-NSSAI can have standard values (e.g., including an SST with a standardized SST value and no SD) or non-standard values (e.g., including an SST and an SD or including an SST without a standardized SST value and no SD). An S-NSSAI with a non-standard value identifies a single network slice within the PLMN with which it is associated. An S-NSSAI with a non-standard value may not be used by the UE in access stratum procedures in any PLMN other than the one to which the S-NSSAI is associated.

Network slices may differ with respects to supported features and network functions optimizations. For example, different S-NSSAIs may have different SSTs. An operator can deploy multiple network slice instances delivering the same features, but for different groups of UEs (e.g., dedicated to a customer different S-NSSAIs with the same SST but different SDs). The network may serve a single UE with one or more network slice instances simultaneously (e.g., via the 5G-AN). In some examples, a UE may be associated with up to eight different S-NSSAIs in total.

AMF instances can be common to network slice instances serving a UE. Selection of the set of network slice instances for a UE is triggered by the first contacted AMF in a registration procedure normally by interacting with the NSSF. A PDU session may belong to one specific network slice instance per PLMN. Different network slice instances may not share a protocol data unit (PDU) session, though different slices may have slice-specific PDU sessions using the same data network name (DNN). In order to enable PDU transmission in a network slice, the UE may request establishment of a PDU session in a network slice towards a DN associated with an S-NSSAI and a (DNN if there is no established PDU session adequate for the PDU transmission. The S-NSSAI included is part of allowed NSSAI of the serving PLMN, which is an S-NSSAI value valid in the serving PLMN, and in roaming scenarios the mapped S-NS-SAI is also included for the PDU session if available.

In certain systems, S-NSSAI values are provided in an NSSAI information element (IE). The The NSSAI IE identifies a collection of S-NSSAIs. FIG. 4 is an example format of the NSSAI IE. As shown in FIG. 4, the example NSSAI IE may have a length of 4-146 octets. The NSSAI IE may indicate up to eight S-NSSAI values for requested NSSAI (sent by a UE) or an allowed NSSAI (sent by the network). The NSSAI IE may indicate up to sixteen S-NSSAI values in a configured NSSAI (sent by the UE and/or the network).

The S-NSSAI identifies a network slice. An example format of the S-NSSAI IE is shown in FIG. 5. The S-NSSAI IE may have a length of 3-10 octets. The S-NSSAI value is coded as the length and value part of the example S-NSSAI IE starting with the second octet. The length of S-NSSAI field may indicate the length of the included S-NSSAI contents. The SST field may indicate SST value. The SD field may indicate the SD value. The mapped HPLMN SST field may indicate the SST value of an S-NSSAI in the S-NSSAI(s) of the HPLMN to which the SST value is mapped. The mapped HPLMN SD field may indicate the SD value of an S-NSSAI in the S-NSSAI(s) of the HPLMN to which the SST value is mapped.

In certain systems, such as 5G NR, the NSSAI IE may be exchanged (e.g., between the UE and the network) as part of mobility management procedures. The NSSAI may be sent at both the non-access stratum (NAS) layer and the AS layer.

In some examples, the Requested NSSAI IE can be sent in a REGISTRATION REQUEST message, except when triggered by a periodic update. As mentioned above, the Requested NSSAI IE may include up to eight S-NSSAI entries, with a size of up to 74 octets.

In some examples, the Allowed NSSAI IE can be sent in a REGISTRATION ACCEPT message, which may be included if the procedure is triggered by a periodic update. As mentioned above, the Allowed NSSAI IE may include up to eighth S-NSSAI entries, with a size of up to 74 octets.

In some examples, the Configured NSSAI IE can be sent in a REGISTRATION ACCEPT message. As mentioned above, the Configured NSSAI IE may include up to sixteen S-NSSAI entries, with a size of up to 146 octets.

In some examples, the Allowed NSSAI IE and the Configured NSSAI IE can be sent in a CONFIGURATION UPDATE COMMAND message.

Thus, the UE NAS layer may provide the lower layers with an NSSAI (either requested NSSAI or allowed NSSAI) when the UE in idle mode sends an initial NAS message.

In addition to exchanging NSSAI information at the NAS layer, the UE can be configured to send NSSAI information in the AS layer based on the NSSAI inclusion mode in which it is operating. FIG. 6 is a table showing example NSSAI inclusion modes, based on which different NSSAI information are provided for different NAS procedures. The network (e.g., via the AMF) may indicate which mode the UE operates in via a NSSAI inclusion mode IE that may be sent in the REGISTRATION ACCEPT message.

Example Ensuring Compatibility Between Network Slice Operating Frequencies and User Equipment (UE) Radio Capabilities Aspects of the present disclosure provide techniques for ensuring compatibility between network slice operating frequencies and user equipment (UE) radio capabilities.

In some cases, UE radio capability information exchanged between a network entity and a network core entity may include information about networks, network frequencies, and other capabilities that the UE supports. For example this information may include information about a UE power class, frequency bands, and the like. The UE can provide this information to a network entity (e.g., a serving base station), and the network entity can provide this information to a network core entity (e.g., an AMF), and the network core entity can store the UE radio capability information. Generally, the UE may provide this radio capability information during the CMIDLE state for the UE and the RM-REGISTERED state for the UE, and the network core entity can delete this information when the UE radio management (RM) state in the network core entity transitions to RM-DEREGISTERED.

The UE may generally provide radio capability information to the network upon request by a network entity or if the radio capabilities changed while the UE was in an idle mode. During a registration request procedure, the UE may not provide the radio capability information if not otherwise solicited when establishing connectivity or sending a registration request message. During a registration process, the network core entity can receive radio capability information from a UE by sending a radio capability match request message to the network entity; however, the network core entity may send the radio capability match request message only in certain situations, such as when the network core entity is attempting to set the IP over Multimedia Subsystem (IMS) voice over packet switched session supported indication.

During registration, the network core entity may set the IMS voice over PS session supported indication. To set this indication, the UE may perform a UE capability match request procedure to check the compatibility of the UE and network entity radio capabilities related to IMS voice over PS. If the network core entity has not received the voice support match indicator from the network entity, the network core entity may set the IMS over PS session supported indication and update the indication at a later stage.

In both of these cases, the network core entity may only receive, from the network entity, a voice support match indicator indicating whether the UE supports voice over packet switched communications. However, the UE may only support some frequencies that the network can communicate on, but a flag indicating that the UE supports voice over packet switched communications may not indicate which frequencies that the UE can support communications on. Thus, the network core entity may also not be aware of the frequencies on which the UE supports communications and cannot determine whether the network slices selected by the network core entity for the allowed set of network slices matches the UE radio capabilities. Further, because the network core entity may not be able to determine whether the network slices selected by the network core entity for the allowed set of network slices, the network core entity may include network slices associated with incompatible frequencies to the allowed set of network slices.

FIG. 7 illustrates example operations 700 that may be performed by a network entity (e.g., a gNodeB, a transmit receive point, a base station, etc.) to ensure compatibility between network slice operating frequencies and user equipment (UE) radio capabilities, in accordance with certain aspects of the present disclosure. As illustrated, operations 700 may begin at block 702, where the network entity receives, from a network core entity, a request for information about a plurality of network slices in an allowed set of network slices for the UE. The request may be received, for example, as an indication that the network core entity is requesting information about UE support for a particular feature or a request for information about UE support for a particular feature on slices in the allowed set of network slices for the UE.

In some aspects, the network entity may receive, from a network core entity, information about an allowed set of network slices for the UE. The information about the allowed set of network slices for the UE may be received in a standalone message from the network core entity or may be included in the request for information about the plurality of network slices received by the network entity at block 702. As discussed, the information about the allowed set of network slices may include information about network slices on which the UE may communicate, some of which may be network slices that the UE can use for voice communications with the network entity.

At block 704, the network entity identifies, based on UE capability information, a subset of the allowed set of network slices that the UE can use for communications between the UE and the network entity. As discussed in further detail below, the UE capability information may have been previously provided to the network entity upon request by the network entity. In some aspects, the UE capability information may have been previously provided to the network entity when the UE previously attached to the network entity, may be provided to the network entity during the UE attachment process, or the like.

In some aspects, the network entity can communicate with the UE based on the identified subset of the allowed set of network slices. For example, the UE may initiate a voice communications session with the network entity on the identified subset of the allowed set of network slices, where the identified subset of network slices in the allowed set of network slices correspond to network slices for which voice communications are supported. More generally, the network entity may communicate with the UE using features supported by the UE on the identified subset of the allowed set of network slices, but may not communicate with the UE using those features on network slices outside of the identified subset of the allowed set of network slices.

At block 706, the network entity generates a response including at least the subset of the allowed set of network slices that the UE can use for communications between the UE and the network entity.

At block 708, the network entity transmits the response to the network core entity.

FIG. 8 illustrates example operations 800 that may be performed by a network core entity (e.g., an AMF) to ensure compatibility between network slice operating frequencies and user equipment (UE) radio capabilities, in accordance with certain aspects of the present disclosure. As illustrated, operations 800 may begin at block 802, where the network core entity transmits, to a network entity, a request for information about a plurality of network slices in an allowed set of network slices for the UE.

At block 804, the network core entity receives, from the network entity, a response including subset of the allowed set of network slices that the UE can use for communications between the UE and the network entity.

At block 806, the network core entity modifies the allowed set of network slices for the UE based on the received response. Generally, in modifying the allowed set of network slices for the UE, the network core entity can identify the subset of network slices that are not included in the received response (e.g., the subset of network slices that are the complement to the subset of the allowed set of network slices included in the received response) and remove this subset from the allowed set of network slices.

To ensure compatibility between network slice operating frequencies and UE radio capabilities, the network core entity may provide, to a network entity (e.g., a serving base station), a list of network slices included in the allowed set of network slices. The list of network slices may, for example, identify the frequency band associated with each network slice in the list of network slices, and the network entity can use this frequency band information to determine which network slices are associated with frequency bands that the UE supports and which network slices are associated with frequency bands other than those that the UE supports. As discussed, in response, the network core entity may receive, from the network entity, information identifying the network slices associated with frequency bands that are supported by the UE. Upon receiving this information, the network core entity may modify the allowed set of network slices to include the network slices associated with frequency bands that are supported by the UE and exclude network slices associated with frequency bands that are not supported by the UE from the allowed set of network slices.

Figure 9:
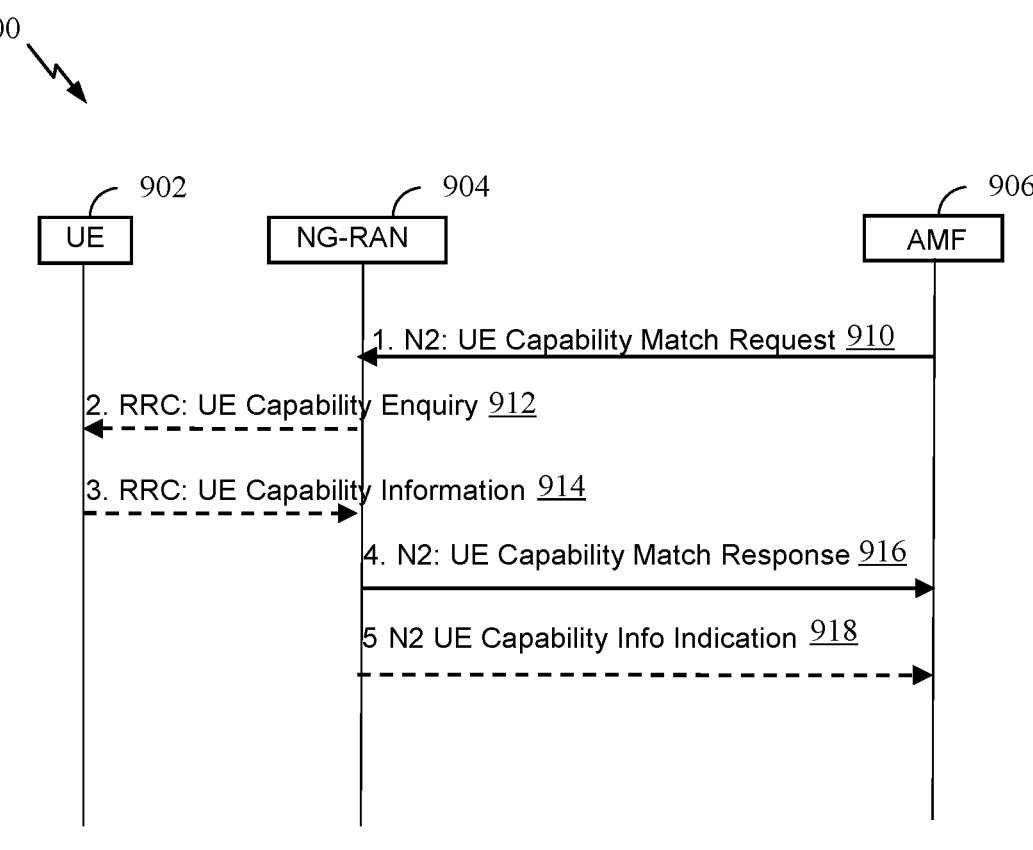
FIG. 9 is a message flow diagram illustrating messages that may be exchanged between a user equipment (UE), network entity, and a network core entity to ensure compatibility between network slice operating frequencies and user equipment (UE) radio capabilities, in accordance with certain aspects of the present disclosure.

FIG. 9 illustrates an example capability match request procedure 900 used to ensure compatibility between network slice operating frequencies and user equipment (UE) radio capabilities, in accordance with certain aspects of the present disclosure. Generally, the capability match request procedure 900 may be used to allow the network core entity to set the IMS voice over PS session supported indication and/or identifying matches between network slices in the allowed set of network slices and the network slices supported by the UE on one or more frequency bands.

As illustrated, the network core entity (e.g., AMF 906) can initiate the capability match request procedure 900 by transmitting, to the network entity (e.g., NG-RAN 904) a UE capability match request message 910. The UE capability match request message 910 may indicate the information that the network core entity is requesting, such as whether the network core entity is requesting the voice support match indicator. The UE capability match request message 910 may also include the allowed set of network slices, which may include the UE NSSAI containing the S-NSSAIs in the allowed set of network slices determined during a UE registration procedure. In some embodiments, the UE capability match request message 910 may further include previously received UE radio capability information.

In response to receiving the UE capability match request message 910, and if the network entity 904 has not already received the UE radio capabilities from the UE 902 or from the network core entity 906, network entity 904 may transmit a UE capability enquiry message 912 to the UE 902 to request that the UE provide its radio capability information to network entity 904. Responsive to receiving the UE capability enquire message 912 from network entity 904, the UE 902 may provide its radio capability information in a UE capability information message 914 transmitted to network entity 904.

After the network entity 904 receives the UE capability information message 914, network entity 904 may determine whether the UE radio capabilities (e.g., reported by the UE in the UE capability information message) are compatible with the network configuration. For example, in a voice call scenario, if the network core entity 906 requests a voice support match indicator in the capability match request message, the network entity 904 can determine whether the UE radio capabilities are compatible with the network configuration for ensuring voice service continuity of voice calls using IMS PS. To determine the appropriate response to the UE capability match request message, the network entity may be configured to determine whether the UE supports specific capabilities needed for voice continuity of voice calls (e.g., on a per-PLMN basis). For example, the network entity 904 can check the UE capability information for an ability to support voice over packet switched communications (e.g., whether the UE supports one or both of E-UTRAN or NG-RAN voice over packet switched communications), radio capabilities for frequency domain duplexing and/or time domain duplexing, supported frequency bands (e.g., for one or both of an E-UTRAN network or an NG-RAN network), support for single radio voice call continuity (SRVCC) from a network supporting a first radio access technology to a network supporting a second radio access technology and support for frequency bands used by the network supporting the second radio access technology, and the like.

In some embodiments, the network core entity 906 may provide, to the network entity 904, the allowed set of network slices for the UE in the UE capability match request message. If the allowed set of network slices for the UE (e.g., the Allowed NSSAI) is provided to the network entity 904, the network entity 904 may determine whether frequencies supported for or otherwise associated with each network slice (e.g., each S-NSSAI) is compatible with the UE radio capabilities based on the UE capability information provided to the network entity 904, discussed above. The network entity 904 may thus identify a subset of network slices in the allowed set of network slices for the UE that the UE is compatible with and report the identified subset of network slices to the network core entity 906 in the UE capability match response message 916 (e.g., in a Supported NSSAI information element in the UE capability match response message).

In some embodiments, if the network entity 904 has requested radio capability information from the UE (e.g., in a situation where the UE has not previously reported such information to the network entity or to the network core entity), the network entity 904 may send the UE radio capability information to the network core entity in UE radio capability information indication message 918. The network core entity may store information about the UE radio capabilities for further provision to a network entity.

Figure 10:
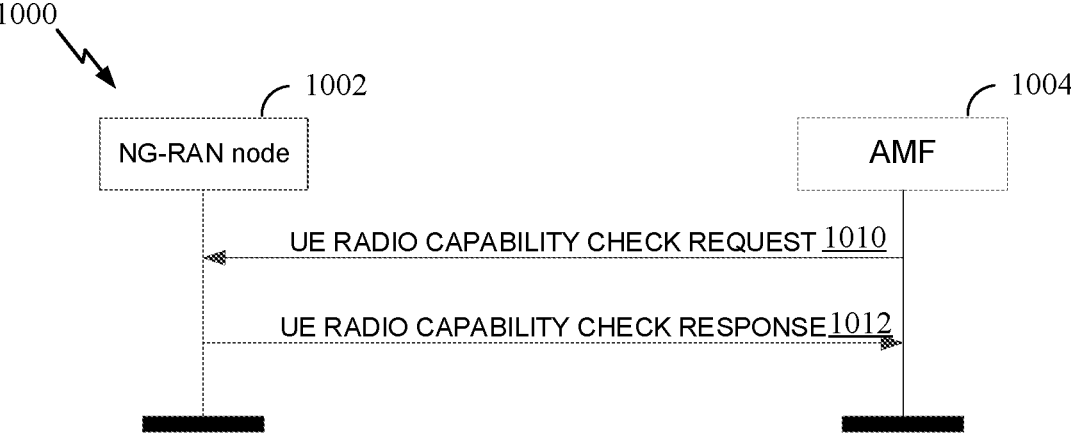
FIG. 10 is a message flow diagram illustrating messages that may be exchanged between a network entity and a network core entity to ensure network slice operating frequencies and user equipment (UE) radio capabilities, in accordance with certain aspects of the present disclosure.

FIG. 10 is a call flow diagram illustrating a UE radio capability check procedure used by a network core entity to request that a network entity identifies and informs the network core entity whether the UE radio capabilities are compatible with a network configuration.

As illustrated, the network core entity 1004 may initiate the procedure by transmitting a UE radio capability check request message 1010 to the network entity 1002. The UE radio capability may include one or both of an indication of whether the network core entity 1004 is requesting a voice support match indicator or UE NSSAI information (e.g., including information about the allowed set of network slices for the UE). If the UE radio capability check message includes an indication that the network entity is requesting a voice support match indicator, the network entity can determine whether the UE radio capabilities are compatible with the network configuration for IMS voice communications. The UE radio capability check response message 1012 transmitted in response to receiving the UE radio capability check request message 1010 may include the voice support match indicator, and the value of the voice support match indicator may correspond to a first value if the UE is compatible with the network configuration or a second value if the UE is not compatible with the network configuration.

If the UE radio capability check request message includes the UE NSSAI (e.g., information about the allowed set of network slices), the network entity 1002 can determine whether the UE radio capabilities are compatible with each frequencies supported for or otherwise associated with each network slice in the allowed set of network slices. The UE radio capability check response message transmitted in response to receiving the UE radio capability check request message may include information (e.g., in a Supported NSSAI information element) identifying the network slices that the UE is compatible with. For example, the information identifying these network slices may be transmitted as a bitmap, a list of compatible network slices, etc.

FIG. 11 illustrates an example UE radio capability check request message 1100, in accordance with certain aspects of the present disclosure. As discussed above, the UE radio capability check request message 1100 may be transmitted by a network core entity (e.g., an AMF) to request that a network entity (e.g., a base station, gNodeB, transmit receive point (TRP), etc.) check compatibility between UE radio capabilities and a network configuration. As illustrated, a UE NSSAI information element, which may be an optional information element, may be included in the UE radio capability check quest. The UE NSSAI information element may include the allowed set of network slices that the network core entity has identified for the UE. Upon receipt of a UE radio capability check request message 1100 including the UE NSSAI information element, the network entity may proceed to determine whether radio capabilities of the UE for which the UE radio capability check request message 1100 is transmitted is compatible with the network configuration (e.g., operating frequencies of the network slices identified in the UE NSSAI information element.

FIG. 12 illustrates an example UE radio capability check response message 1200, in accordance with certain aspects of the present disclosure. As discussed above, the UE radio capability check response message 1200 may be transmitted by a network entity in response to receiving a UE radio capability check request message 1100 illustrated in FIG. 11 from the network core entity. As illustrated, the UE radio capability check response message 1200 includes a Supported NSSAI information element. The Supported NSSAI information element may be an optional information element that may be included in the UE radio capability check response message 1200 if the UE NSSAI information element is included in the corresponding UE radio capability check request message 1100 and may be excluded from the UE radio capability check response message 1200 otherwise. As discussed, the Supported NSSAI information element may carry information identifying the network slices with which the UE is compatible. A receiving network core entity may use the information carried in the Supported NSSAI information element to modify the allowed set of network slices for the UE (e.g., to remove network slices that are incompatible with the UE from the allowed set of network slices).

FIG. 13 illustrates a communications device 1300 that may include various components (e.g., corresponding to means-plus-function components) configured to perform operations for the techniques disclosed herein, such as the operations illustrated in FIG. 7. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 7, or other operations for performing the various techniques discussed herein for ensuring compatibility between network slice operating frequencies and UE radio capabilities. In certain aspects, computer-readable medium/memory 1312 stores code 1314 for receiving, from a network core entity, a request for information about a plurality of network slices in an allowed set of network slices for the UE, code 1316 for identifying, based on UE capability information, a subset of the allowed set of network slices that the UE can use for communications between the UE and the network entity, code 1318 for generating a response including at least the subset of the allowed set of network slices, and code 1320 for transmitting the response, in accordance with aspects of the disclosure. In certain aspects, the processor 1304 has circuitry configured to implement the code stored in the computer-readable medium/memory 1312. The processor 1304 includes circuitry 1322 for receiving, from a network core entity, a request for information about a plurality of network slices in an allowed set of network slices for the UE, circuitry 1324 for identifying, based on UE capability information, a subset of the allowed set of network slices that the UE can use for communications between the UE and the network entity, circuitry 1326 for generating a response including at least the subset of the allowed set of network slices, and circuitry 1328 for transmitting the response, in accordance with aspects of the disclosure.

Figure 14:
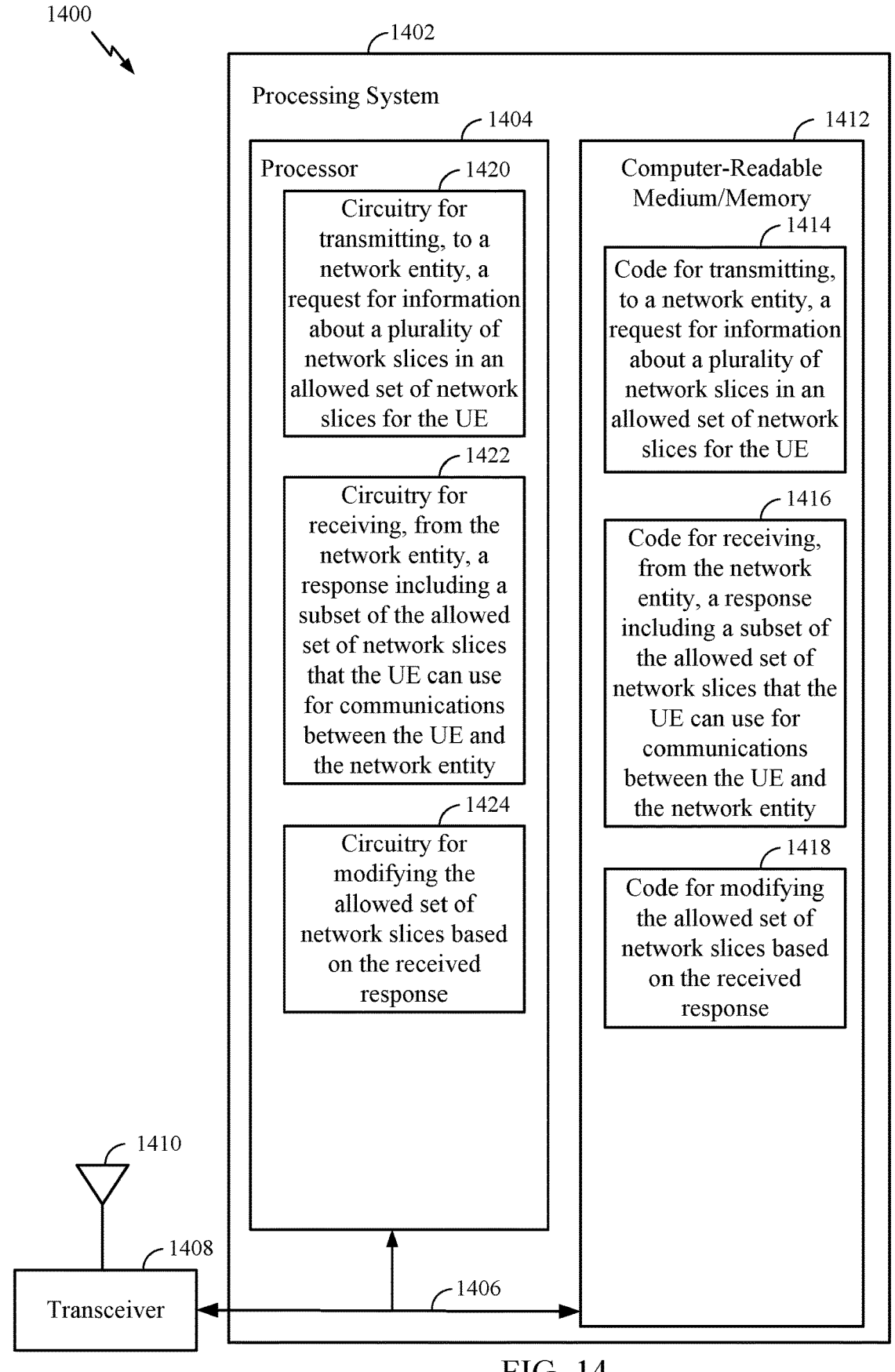
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8, or other operations for performing the various techniques discussed herein for ensuring compatibility between network slice operating frequencies and UE radio capabilities. In certain aspects, computer-readable medium/memory 1412 stores code 1414 for transmitting, to a network entity, a request for information about a plurality of network slices in an allowed set of network slices for the UE, code 1416 for receiving, from the network entity, a response including a subset of the allowed set of network slices that the UE can use for communications between the UE and the network entity, and code 1418 for modifying the allowed set of network slices based on the received response, in accordance with aspects of the disclosure. In certain aspects, the processor 1404 has circuitry configured to implement the code stored in the computer-readable medium/memory 1412. The processor 1404 includes circuitry 1420 for transmitting, to a network entity, a request for information about a plurality of network slices in an allowed set of network slices for the UE, circuitry 1422 for receiving, from the network entity, a response including a subset of the allowed set of network slices that the UE can use for communications between the UE and the network entity, and circuitry 1424 for modifying the allowed set of network slices based on the received response, in accordance with aspects of the disclosure.

Example Clauses

Clause 1: A method for wireless communications by a network entity, comprising: receiving, from a network core entity, a request for information about a plurality of network slices in an allowed set of network slices for a user equipment (UE) connected with the network entity; identifying, based on UE capability information for the UE, a subset of the allowed set of network slices that the UE can use for communications between the UE and the network entity; generating a response including at least the subset of the allowed set of network slices that the UE can use for communications between the UE and the network entity; and transmitting the response to the network core entity.

Clause 2: The method of Clause 1, further comprising: communicating with the UE using at least the subset of the allowed set of network slices.

Clause 3: The method of any one of Clauses 1 or 2, wherein the UE comprises a UE for which a registration process is currently being performed.

Clause 4: The method of any one of Clauses 1 through 3, wherein the request for information about capabilities of the UE comprises an indication that the network core entity is requesting information about UE support for a particular feature on slices in the allowed set of network slices for the UE.

Clause 5: The method of Clause 4, wherein the indication that the network core entity is requesting information about the allowed set of network slices for the UE comprises an indication that the network core entity is requesting a voice support match indicator.

Clause 6: The method of any one of Clauses 1 through 5, wherein the response comprises: a first message including an indication of whether the UE supports a particular feature, and a second message including the subset of the allowed set of network slices that the UE can use for communications between the UE and the network entity using the particular feature.

Clause 7: The method of any one of Clauses 1 through 6, further comprising: requesting, from the UE, the UE capability information; and receiving the UE capability information from the UE.

Clause 8: The method of Clause 7, wherein the UE capability information comprises one or more of: frequencies that the UE supports communications on for one or more radio access technologies (RATs); or radio capabilities for one or both of frequency division duplexing or time domain duplexing.

Clause 9: The method of any one of Clauses 1 through 8, wherein identifying the subset of the allowed set of network slices that the UE can use for communications between the UE and the network entity comprises identifying, from the plurality of network slices in the allowed set of network slices, network slices associated with frequencies supported by the UE.

Clause 10: A method for wireless communications by a network core entity, comprising: transmitting, to a network entity, a request for information about a plurality of network slices in an allowed set of network slices for a user equipment (UE); receiving, from the network entity, a response including a subset of the allowed set of network slices that the UE can use for communications between the UE and the network entity; and modifying the allowed set of network slices for the UE based on the received response.

Clause 11: The method of Clause 10, wherein the UE comprises a UE for which a registration process is currently being performed.

Clause 12: The method of any one of Clauses 10 or 11, wherein the request for information about capabilities of the UE includes a request for information about UE support for a particular feature on slices in the allowed set of network slices.

Clause 13: The method of Clause 12, wherein the request for information about the allowed set of network slices comprises a voice support match indicator.

Clause 14: The method of any one of Clauses 10 through 13, wherein the response comprises: a first message including an indication of whether the UE supports a particular feature, and a second message including the subset of the allowed set of network slices that the UE can use for communications between the UE and the network entity using the particular feature.

Clause 15: The method of any one of Clauses 10 through 14, wherein the subset of the allowed set of network slices that the UE can use for communications between the UE and the network entity comprises network slices associated with frequencies supported by the UE.

Clause 16: A method for wireless communications by a network entity, comprising: receiving, from a network core entity, information about a plurality of network slices in an allowed set of network slices for a user equipment (UE) connected with the network entity; identifying, based on UE capability information for the UE, a subset of the allowed set of network slices that the UE can use for communications between the UE and the network entity; and communicating with the UE using one or more slices in the identified subset of the allowed set of network slices.

Clause 17: The method of Clause 16, wherein the UE comprises a UE for which a registration process is currently being performed.

Clause 18: The method of any one of Clauses 16 or 17, further comprising: generating a response including at least the subset of the allowed set of network slices that the UE can use for communications between the UE and the network entity; and transmitting the response to the network core entity.

Clause 19: The method of Clause 18, wherein the response comprises: a first message including an indication of whether the UE supports a particular feature, and a second message including the subset of the allowed set of network slices that the UE can use for communications between the UE and the network entity using the particular feature.

Clause 20: The method of any one of Clauses 16 through 19, further comprising: requesting, from the UE, the UE capability information; and receiving the UE capability information from the UE.

Clause 21: The method of any one of Clauses 16 through 20, wherein identifying the subset of the allowed set of network slices that the UE can use for communications between the UE and the network entity comprises identifying, from the plurality of network slices in the allowed set of network slices, network slices associated with frequencies supported by the UE.

Clause 22: A system, comprising: a memory having executable instructions stored thereon; and a processor configured to execute the executable instructions to perform the operations of any one of Clauses 1 through 21.

Clause 23: A system, comprising: means for performing the operations of any one of Clauses 1 through 21.

Clause 24: A computer-readable medium having instructions stored thereon which, when executed by a processor, performs the operations of any one of Clauses 1 through 21.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a network entity, comprising:
   memory having executable instructions stored thereon; and
   one or more processors configured, individually or collectively, to execute the executable instructions and cause the apparatus to:
   receive, from a network core entity, a request for information about a plurality of network slices in an allowed set of network slices for a user equipment (UE) connected with the network entity, wherein the request for information includes a list of the plurality of network slices in the allowed set of network slices;
   identify, based on UE capability information for the UE, a subset of the allowed set of network slices that the UE can use for communications between the UE and the network entity;
   generate a response including at least the subset of the allowed set of network slices that the UE can use for communications between the UE and the network entity; and
   transmit the response to the network core entity.

2. The apparatus of claim 1, wherein the one or more processors are further configured, individually or collectively, to cause the apparatus to: communicate with the UE using at least the subset of the allowed set of network slices.

3. The apparatus of claim 1, wherein the UE comprises a UE for which a registration process is currently being performed.

4. The apparatus of claim 1, wherein the request for information comprises an indication that the network core entity is requesting information about UE support for a particular feature on slices in the allowed set of network slices for the UE.

5. The apparatus of claim 4, wherein the indication that the network core entity is requesting information about the allowed set of network slices for the UE comprises an indication that the network core entity is requesting a voice support match indicator.

6. The apparatus of claim 1, wherein the response comprises:
   a first message including an indication of whether the UE supports a particular feature, and
   a second message including the subset of the allowed set of network slices that the UE can use for communications between the UE and the network entity using the particular feature.

7. The apparatus of claim 1, wherein the one or more processors are further configured, individually or collectively, to cause the apparatus to:
   request, from the UE, the UE capability information; and
   receive the UE capability information from the UE.

8. The apparatus of claim 7, wherein the UE capability information comprises one or more of:
   frequencies that the UE supports communications on for one or more radio access technologies (RATs); or
   radio capabilities for one or both of frequency division duplexing or time domain duplexing.

9. The apparatus of claim 1, wherein the one or more processors are configured, individually or collectively, to identify the subset of the allowed set of network slices that the UE can use for communications between the UE and the network entity by identifying, from the plurality of network slices in the allowed set of network slices, network slices associated with frequencies supported by the UE.

10. An apparatus for wireless communications by a network core entity, comprising:
   memory having executable instructions stored thereon; and
   one or more processors configured, individually or collectively, to execute the executable instructions and cause the apparatus to:
   transmit, to a network entity, a request for information about a plurality of network slices in an allowed set of network slices for a user equipment (UE), wherein the request for information includes a list of the plurality of network slices in the allowed set of network slices;

receive, from the network entity, a response including a subset of the allowed set of network slices that the UE can use for communications between the UE and the network entity;

and modify the allowed set of network slices for the UE based on the received response.

11. The apparatus of claim 10, wherein the UE comprises a UE for which a registration process is currently being performed.

12. The apparatus of claim 10, wherein the request for information includes a request for information about UE support for a particular feature on slices in the allowed set of network slices.

13. The apparatus of claim 12, wherein the request for information about the allowed set of network slices comprises a voice support match indicator.

14. The apparatus of claim 10, wherein the response comprises:

a first message including an indication of whether the UE supports a particular feature, and a second message including the subset of the allowed set of network slices that the UE can use for communications between the UE and the network entity using the particular feature.

15. The apparatus of claim 10, wherein the subset of the allowed set of network slices that the UE can use for communications between the UE and the network entity comprises network slices associated with frequencies supported by the UE.

16. An apparatus for wireless communications by a network entity, comprising:

memory having executable instructions stored thereon; and one or more processors configured, individually or collectively, to execute the executable instructions and cause the apparatus to:

receive, from a network core entity, information about a plurality of network slices in an allowed set of network slices for a user equipment (UE) connected with the network entity, wherein the request for information includes a list of the plurality of network slices in the allowed set of network slices;

identify, based on UE capability information for the UE, a subset of the allowed set of network slices that the UE can use for communications between the UE and the network entity;

and communicate with the UE using the identified subset of the allowed set of network slices.

17. The apparatus of claim 16, wherein the UE comprises a UE for which a registration process is currently being performed.

18. The apparatus of claim 16, wherein the one or more processors are further configured, individually or collectively, to cause the apparatus to:

generate a response including at least the subset of the allowed set of network slices that the UE can use for communications between the UE and the network entity; and transmit the response to the network core entity.

19. The apparatus of claim 18, wherein the response comprises:

a first message including an indication of whether the UE supports a particular feature, and a second message including the subset of the allowed set of network slices that the UE can use for communications between the UE and the network entity using the particular feature.

20. The apparatus of claim 16, wherein the one or more processors are further configured, individually or collectively, to cause the apparatus to:

request, from the UE, the UE capability information; and receive the UE capability information from the UE.

21. The apparatus of claim 16, wherein the one or more processors are configured, individually or collectively, to identify the subset of the allowed set of network slices that the UE can use for communications between the UE and the network entity by identifying, from the plurality of network slices in the allowed set of network slices, network slices associated with frequencies supported by the UE.

22. A method for wireless communications by a network entity, comprising:

receiving, from a network core entity, a request for information about a plurality of network slices in an allowed set of network slices for a user equipment (UE), wherein the request for information includes a list of the plurality of network slices in the allowed set of network slices, identifying, based on UE capability information for the UE, a subset of the allowed set of network slices that the UE can use for communications between the UE and the network entity, generating a response including at least the subset of the allowed set of network slices that the UE can use for communications between the UE and the network entity, and transmitting the response to the network core entity.

23. The method of claim 22, further comprising: communicating with the UE using at least the subset of the allowed set of network slices.

24. The method of claim 22, wherein the UE comprises a UE for which a registration process is currently being performed.

25. The method of claim 22, wherein the request for information comprises an indication that the network core entity is requesting information about the allowed set of network slices for the UE.

26. The method of claim 25, wherein the indication that the network core entity is requesting information about the allowed set of network slices for the UE comprises an indication that the network core entity is requesting a voice support match indicator.

27. The method of claim 22, wherein the response comprises:

a first message including an indication of whether the UE supports a particular feature, and a second message including the subset of the allowed set of network slices that the UE can use for communications between the UE and the network entity using the particular feature.

28. The method of claim 22, further comprising:

requesting, from the UE, UE capability information; and receiving the UE capability information from the UE.

29. The method of claim 28, wherein the UE capability information comprises one or more of:

frequencies that the UE supports communications on for one or more radio access technologies (RATs); or radio capabilities for one or both of frequency division duplexing or time domain duplexing.

30. The method of claim 22, wherein identifying the subset of the allowed set of network slices that the UE can use for communications between the UE and the network entity comprises identifying, from the plurality of network slices in the allowed set of network slices, network slices associated with frequencies supported by the UE.

* * * * *